(12) United States Patent
Morishige et al.

(10) Patent No.: US 9,400,015 B2
(45) Date of Patent: *Jul. 26, 2016

(54) SYNTHETIC RESIN-MADE SLIDING BEARING

(71) Applicant: OILES CORPORATION, Tokyo (JP)

(72) Inventors: Kouichi Morishige, Fujisawa (JP); Takashi Horiguchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,001

(22) Filed: Apr. 22, 2015

(65) Prior Publication Data

US 2015/0226263 A1    Aug. 13, 2015

Related U.S. Application Data

(63) Continuation of application No. 14/352,579, filed as application No. PCT/JP2012/006877 on Oct. 26, 2012, now Pat. No. 9,039,285.

(30) Foreign Application Priority Data

Nov. 2, 2011  (JP) .................. 2011-241702

(51) Int. Cl.
 *F16C 17/10* (2006.01)
 *F16C 33/74* (2006.01)
 *F16C 33/20* (2006.01)
 *F16C 17/04* (2006.01)

(52) U.S. Cl.
 CPC ................. *F16C 33/74* (2013.01); *F16C 17/04* (2013.01); *F16C 17/10* (2013.01); *F16C 33/20* (2013.01); *F16C 2361/53* (2013.01)

(58) Field of Classification Search
 CPC ........... F16C 33/74; F16C 17/10; F16C 33/20
 See application file for complete search history.

(56) References Cited

U.S. PATENT DOCUMENTS

| | | | |
|---|---|---|---|
| 4,239,301 A | 12/1980 | Pannwitz | |
| 4,699,530 A | 10/1987 | Satoh et al. | |
| 5,476,326 A | 12/1995 | Ueno et al. | |
| 8,066,435 B2 | 11/2011 | Miyata et al. | |
| 9,039,285 B2 * | 5/2015 | Morishige et al. ............ | 384/420 |

(Continued)

FOREIGN PATENT DOCUMENTS

| | | |
|---|---|---|
| CN | 1764793 B | 10/2010 |
| CN | 101981339 | 2/2011 |

(Continued)

OTHER PUBLICATIONS

International Search Resort for PCT/JP2012/006877, mailed Nov. 27, 2012.

(Continued)

*Primary Examiner* — Thomas R. Hannon
(74) *Attorney, Agent, or Firm* — Nixon & Vanderhye P.C.

(57) ABSTRACT

A synthetic resin-made thrust sliding bearing includes a synthetic resin-made upper casing which is fixed to a vehicle body side via a mounting member; a synthetic resin-made lower casing which is superposed on the upper casing so as to be rotatable about an axis in a circumferential direction relative to the upper casing; and a synthetic resin-made sliding bearing piece disposed in a space between the upper casing and the lower casing.

20 Claims, 14 Drawing Sheets

(56) References Cited

U.S. PATENT DOCUMENTS

| | | |
|---|---|---|
| 2006/0215945 A1 | 9/2006 | Miyata et al. |
| 2007/0267793 A1 | 11/2007 | Chamousset et al. |
| 2009/0180719 A1 | 7/2009 | Miyata et al. |
| 2010/0202716 A1 | 8/2010 | Kaneko |
| 2011/0019951 A1 | 1/2011 | Kaneko |
| 2012/0189237 A1 | 7/2012 | Montboeuf et al. |

FOREIGN PATENT DOCUMENTS

| | | |
|---|---|---|
| JP | 2001-082457 | 3/2001 |
| JP | 2004-293589 | 10/2004 |
| JP | 2007-303613 | 11/2007 |
| JP | 2008-175349 | 7/2008 |
| JP | 2009-250278 | 10/2009 |
| WO | WO 2010/063305 | 6/2010 |

OTHER PUBLICATIONS

Parent; U.S. Appl. No. 14/352,579, filed Apr. 17, 2014, Morishige et al.

Office Action issued in Chinese Application No. 201280053612.6 dated Aug. 21, 2015 (w/ trans.).

Extended European Search Report issued in EP Application No. 12846174.6 dated Oct. 22, 2015.

* cited by examiner

SYNTHETIC RESIN-MADE SLIDING BEARING

CROSS REFERENCE TO RELATED APPLICATION

This application is a continuation of U.S. patent application Ser. No. 14/352,579, filed Apr. 17, 2014, now allowed, which is the U.S. national phase of International Application No. PCT/JP2012/006877, filed Oct. 26, 2012, which designated the U.S. and claims priority to JP Application 2011-241702, filed Nov. 2, 2011, the entire contents of each of which are hereby incorporated by reference.

TECHNICAL FIELD

The present invention relates to a synthetic resin-made sliding bearing, and more particularly to a sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type of structure in which the axis of the coil spring is actively offset with respect to the axis of the strut, so as to allow the sliding of a piston rod of the shock absorber incorporated in the strut to be effected smoothly, and there is another type of structure in which the axis of the coil spring is arranged in alignment with the axis of the strut. In either structure, a rolling bearing using balls or needles or a synthetic resin-made sliding bearing is disposed between a mounting member for a motor vehicle body and an upper spring seat member of the suspension coil spring to allow the rotation to be effected smoothly when the strut assembly rotates together with the suspension coil spring by the steering operation.

PRIOR ART DOCUMENTS

Patent Documents

[Patent Document 1] JP-A-2004-293589
[Patent Document 2] JP-A-2009-250278

Incidentally, since the upper spring seat member, on which the aforementioned bearing is disposed, is generally made of sheet metal and is therefore relatively heavy, and since the upper spring seat member made of sheet metal needs to be provided with coating for rust prevention, even if the sliding bearing is used instead of the expensive rolling bearing to attain the light weight and a low price of the undercarriage of the motor vehicle, there are limits to such attempts for the light weight and the low price owing to the weight, manufacturing cost, assembly cost, and the like of the upper spring seat member.

In Patent Document 1, a strut sliding bearing is proposed which is comprised of a synthetic resin-made upper casing having a vehicle body-side bearing surface for a vehicle body side and an annular lower surface; a synthetic resin-made lower casing which is superposed on the upper casing so as to be rotatable about the axis of the upper casing, and has an annular upper surface opposed to the annular lower surface of the upper casing; and a synthetic resin-made annular thrust sliding bearing piece which is interposed between the annular lower surface and the annular upper surface, wherein a spring bearing surface for a suspension coil spring is integrally formed on a portion of the lower casing on an outer peripheral side of the vehicle body-side bearing surface and the thrust sliding bearing piece.

In addition, in Patent Document 2, a thrust sliding bearing is proposed which is comprised of a synthetic resin-made upper casing which has a vehicle body-side bearing surface for a vehicle body side and an annular lower surface; a synthetic resin-made lower casing on which an annular upper surface opposed to the annular lower surface and a spring bearing surface for a suspension coil spring are integrally formed, and which is superposed on the upper casing so as to be rotatable about an axis of the upper casing; and a thrust sliding bearing piece which is disposed in an annular gap between the annular lower surface and the annular upper surface, and has an annular thrust sliding bearing surface which slidably abuts against at least one of the annular lower surface and the annular upper surface, wherein the vehicle body-side bearing surface, the thrust sliding bearing surface, and the spring bearing surface are arranged by being juxtaposed to each other in an axial direction.

According to these sliding bearings, since the lower casing has the spring bearing surface for the suspension coil spring, it is possible to omit the spring seat member made of sheet metal, so that it is possible to eliminate a weight increase ascribable to the upper spring seat member made of sheet metal and a price increase ascribable to such as the fabrication, coating, and assembly of the upper spring seat member made of sheet metal, thereby making it possible to attain the light weight and a low price of the undercarriage of the motor vehicle.

SUMMARY OF THE INVENTION

Problems that the Invention is to Solve

However, as the spring seat member made of sheet metal is omitted in the above-described sliding bearing, in cases where, for instance, cleaning with a high-pressure water jet of a high-pressure washing machine is performed regularly or irregularly in order to remove the contamination caused by muddy water or the like at the undercarriage of the motor vehicle, there is a possibility of the cleaning water constituted by the high-pressure water jet entering the interior of the sliding bearing and causing the lubricating oil such as grease to flow out, thereby causing trouble such as a decline in sliding characteristics.

The present invention has been devised in view of the above-described aspects, and its object is to provide a synthetic resin-made sliding bearing which is capable of preventing as practically as possible the ingress of the cleaning water into its interior and does not cause trouble ascribable to the ingress of the cleaning water into its interior even in cases where cleaning with a high-pressure water jet of a high-pressure washing machine is performed regularly or irregularly in order to remove the contamination caused by muddy water or the like at the undercarriage of the motor vehicle.

Means for Solving the Problems

A synthetic resin-made sliding bearing in accordance with the present invention comprises: a synthetic resin-made upper casing, a synthetic resin-made lower casing superposed on the upper casing so as to be rotatable about an axis in a circumferential direction relative to the upper casing, and a synthetic resin-made sliding bearing piece disposed in a space between the upper casing and the lower casing, wherein the upper casing integrally includes: an annular upper casing base portion having an annular lower surface in an axial direction; an inner peripheral-side cylindrical suspended portion suspended from a radial inner peripheral end portion of the upper casing base portion; an outer peripheral-side cylindrical suspended portion suspended from a radial outer peripheral end portion of the upper casing base portion; an intermediate cylindrical suspended portion forming an annular recessed portion in cooperation with an inner surface of the outer peripheral-side cylindrical suspended portion and suspended downwardly from the annular lower surface; and an engaging hook portion which protrudes radially inwardly from an inner peripheral surface of an end portion of the outer peripheral-side cylindrical suspended portion, wherein the lower casing integrally includes: an annular lower casing base portion which has an annular upper surface in the axial direction; a central cylindrical protruding portion protruding axially upwardly from the annular upper surface of the lower casing base portion; a cylindrical portion protruding axially downwardly from an inner peripheral portion of an annular lower surface of the lower casing base portion; an intermediate cylindrical protrusion protruding axially upwardly from an outer peripheral edge of an annular upper surface of the central cylindrical protruding portion; an outer cylindrical protruding portion which protrudes radially outwardly from an outer peripheral surface of the central cylindrical protruding portion so as to form an outer annular recessed portion on the outer peripheral surface of the central cylindrical protruding portion in cooperation with an outer peripheral surface of the intermediate cylindrical protrusion, and which has on its outer peripheral surface an enlarged-diameter tapered surface which is gradually enlarged in diameter toward an axially lower side, a reduced-diameter tapered surface which is continuously connected to the enlarged-diameter tapered surface, forms an engaged hook portion in cooperation with the enlarged-diameter tapered surface, and is gradually reduced in diameter toward the axially lower side, and a curved recessed surface continuously connected to the reduced-diameter tapered surface; and a wide annular flange portion which is formed on the outer peripheral surface of the central cylindrical protruding portion in such a manner as to extend radially outwardly such that its upper surface is continuously connected to the curved recessed surface and its lower surface is flush with the annular lower surface of the lower casing base portion, wherein the sliding bearing piece is disposed in the space including an annular space between the annular lower surface of the upper casing base portion and the annular upper surface of the central cylindrical protruding portion and a cylindrical space between an outer peripheral surface of the inner peripheral-side cylindrical suspended portion and a cylindrical inner peripheral surface of the central cylindrical protruding portion, so as to be brought at an axial annular upper surface and a radial cylindrical inner peripheral surface thereof into slidable contact with the annular lower surface of the upper casing base portion and a radial outer peripheral surface of the inner peripheral-side cylindrical suspended portion, respectively, while being brought at an axial annular lower surface and a radial cylindrical outer peripheral surface thereof into contact with an axial annular upper surface of the central cylindrical protruding portion and a radial cylindrical inner peripheral surface of the central cylindrical protruding portion, respectively, and wherein the upper casing is superposed on the lower casing so as to be rotatable about the axis in the circumferential direction, such that an outer sealing portion for performing labyrinth action is formed by disposing the intermediate cylindrical suspended portion in the outer annular recessed portion of the lower casing and by disposing an axial upper end portion of the outer cylindrical protruding portion of the lower casing in the annular recessed portion, and such that the engaging hook portion is resiliently fitted to the engaged hook portion, and a clearance formed by the curved recessed surface and the engaging hook portion in a resiliently fitting section including the engaging hook portion and the engaged hook portion is covered by the wide annular flange portion of the lower casing downward in the axial direction.

According to the synthetic resin-made sliding bearing in accordance with the present invention, even in cases where cleaning with a high-pressure water jet of a high-pressure washing machine is performed to remove the contamination caused by muddy water or the like at the undercarriage of the motor vehicle, since the annular clearance formed by the curved recessed surface and the engaging hook portion in the resiliently fitting section serving as an entry port into the interior is covered by the wide annular flange portion of the lower casing downward in the axial direction, the cleaning water constituted by the high-pressure water jet is prevented as practically as possible from directly entering the interior, so that the lubricating oil such as grease filled in the interior does not flow outside the bearing, thereby making it possible to prevent as practically as possible a decline in the bearing performance ascribable to the efflux of the lubricating oil.

In the synthetic resin-made sliding bearing in accordance with the present invention, the upper casing may be superposed on the lower casing such that an inner sealing portion for performing labyrinth action is formed between an axial lower portion of the inner peripheral-side cylindrical suspended portion and the inner peripheral surface of the central cylindrical protruding portion.

According to such a sliding bearing, since the inner sealing portion for performing labyrinth action is formed between the axial lower portion of the inner peripheral-side cylindrical suspended portion and the inner peripheral surface of the central cylindrical protruding portion, such inner sealing portion prevents as practically as possible the cleaning water constituted by the high-pressure water jet from entering the interior from the inner peripheral side, so that the lubricating oil such as grease filled in the interior does not flow outside the bearing, thereby making it possible to prevent as practically as possible a decline in the bearing performance ascribable to the efflux of the lubricating oil.

In the synthetic resin-made sliding bearing in accordance with the present invention, a plurality of through holes may be formed in an outer peripheral edge side of the wide annular flange portion along the circumferential direction.

As the plurality of through holes are formed in the outer peripheral edge side of the wide annular flange portion, the arrangement provided is such that when a high-pressure water jet from the high-pressure washing machine has impinged against the mounting member side of the vehicle body, the water jet reflected therefrom is drained through the through holes in the annular flange portion, and the through holes serve as drains for preventing the jet water from being accumulated on the upper surface of the annular flange portion.

The sliding bearing piece may include: an annular thrust sliding bearing piece portion having an annular upper surface which is brought into slidable contact with the annular lower surface of the upper casing base portion and an annular lower surface which is brought into contact with the annular upper surface of the central annular protruding portion; and a cylindrical radial sliding bearing piece portion which, at its one annular end portion, is integrally formed on one annular end portion of the thrust bearing piece portion in such a manner as to extend axially downwardly from that one end portion and has a cylindrical inner peripheral surface which is brought into slidable contact with the outer peripheral surface of the inner peripheral-side cylindrical suspended portion and a cylindrical outer peripheral surface which is brought into contact with the inner peripheral surface of the central cylindrical protruding portion.

The thrust sliding bearing piece portion may have an annular groove formed on an inner peripheral side of its annular upper surface and a plurality of radial grooves which are open at their one ends to the annular groove and are open at their other ends to the outer peripheral surface, and which are formed on the upper surface by being spaced apart at equal intervals in the circumferential direction, and the radial sliding bearing piece portion may have a plurality of axial grooves which are open at their both ends and are formed on the cylindrical inner peripheral surface by being spaced apart at equal intervals in the circumferential direction. The annular groove and the plurality of radial grooves serve as a sump section for lubricating oil such as grease.

The thrust sliding bearing piece portion may have pluralities of inner recessed portions and outer recessed portions which are formed in its annular upper surface along the circumferential direction and in at least two rows including an inner row and an outer row in the radial direction, and these inner recessed portions and outer recessed portions may be arranged with phase differences with respect to each other in the circumferential direction.

Each of the plurality of inner recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces. In addition, each of the plurality of outer recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

A ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%, preferably 30 to 40%.

In these inner recessed portions and outer recessed portions for retaining lubricating oil such as grease, in order to allow the low friction properties of the lubricating oil to be exhibited satisfactorily, it suffices if the ratio of the total area of opening surfaces of the pluralities of inner recessed portions and outer recessed portions in the surfaces which combine the opening surfaces of the pluralities of inner recessed portions and outer recessed portions and the annular upper surface of the thrust sliding bearing piece portion is at least 20%. If this ratio exceeds 50%, the strength of the thrust sliding bearing piece portion is caused to decline, and plastic deformation such as creep is liable to occur.

The synthetic resin-made sliding bearing in accordance with the present invention is preferably used as a thrust sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin, and the synthetic resin for forming the lower casing may be a thermoplastic synthetic resin such as polyacetal resin, polyamide resin, or polybutylene terephthalate resin containing reinforcing fibers including glass fibers, carbon fibers, and the like. As the synthetic resin for forming the sliding bearing piece, it is possible to cite a thermoplastic synthetic resin such as polyacetal resin, polyamide resin, polybutylene terephthalate resin, or polyolefin resin such as polyethylene resin as preferred examples.

Advantages of the Invention

According to the present invention, it is possible to provide a synthetic resin-made sliding bearing in which, since the wide annular flange portion formed integrally on the outer peripheral surface of the central cylindrical protruding portion of the lower casing base portion covers the annular clearance formed by the curved recessed surface and the engaging hook portion in the resiliently fitting section serving as an entry port into the interior, even in cases where cleaning with a high-pressure water jet of a high-pressure washing machine is performed to remove the contamination caused by muddy water or the like at the undercarriage of the motor vehicle, the ingress of the cleaning water into the interior can be prevented as practically as possible, and trouble ascribable to the ingress of the cleaning water into the interior does not occur.

MODE FOR CARRYING OUT THE INVENTION

Figure 1:
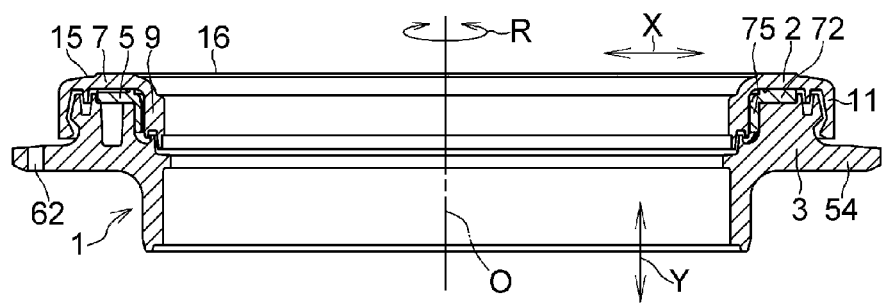
FIG. 1 is an explanatory cross-sectional view, taken in the direction of arrows along line I-I shown in FIG. 2, of a preferred embodiment of the present invention.
Figure 2:
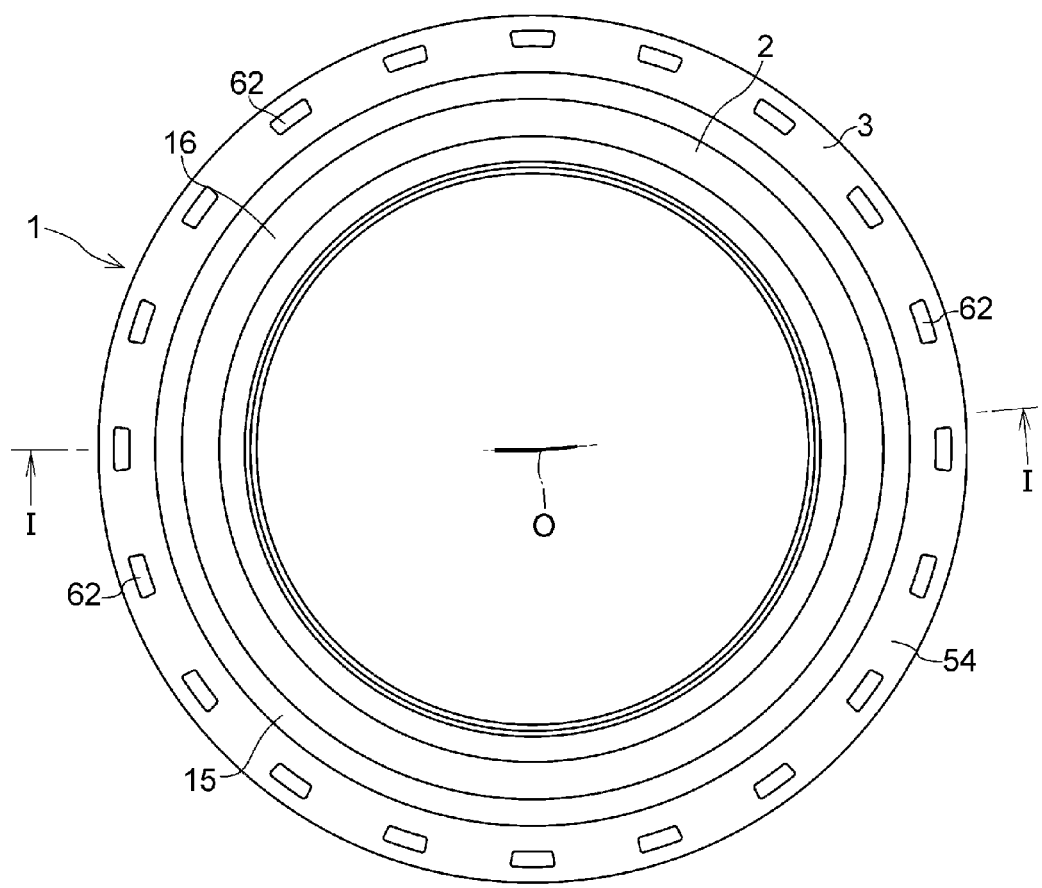
FIG. 2 is an explanatory plan view of the embodiment shown in FIG. 1
Figure 3:
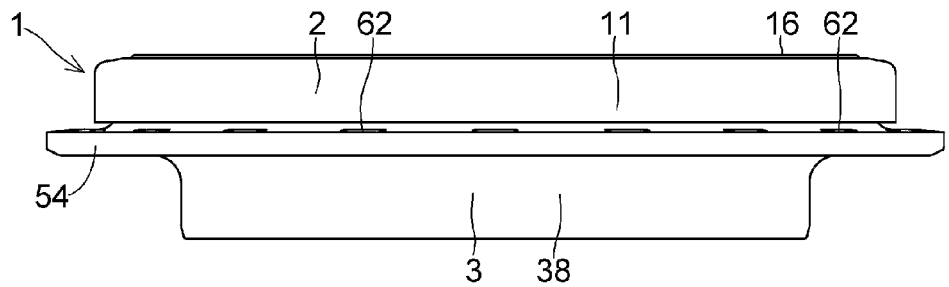
FIG. 3 is an explanatory front elevational view of the embodiment shown in FIG. 1.
Figure 4:
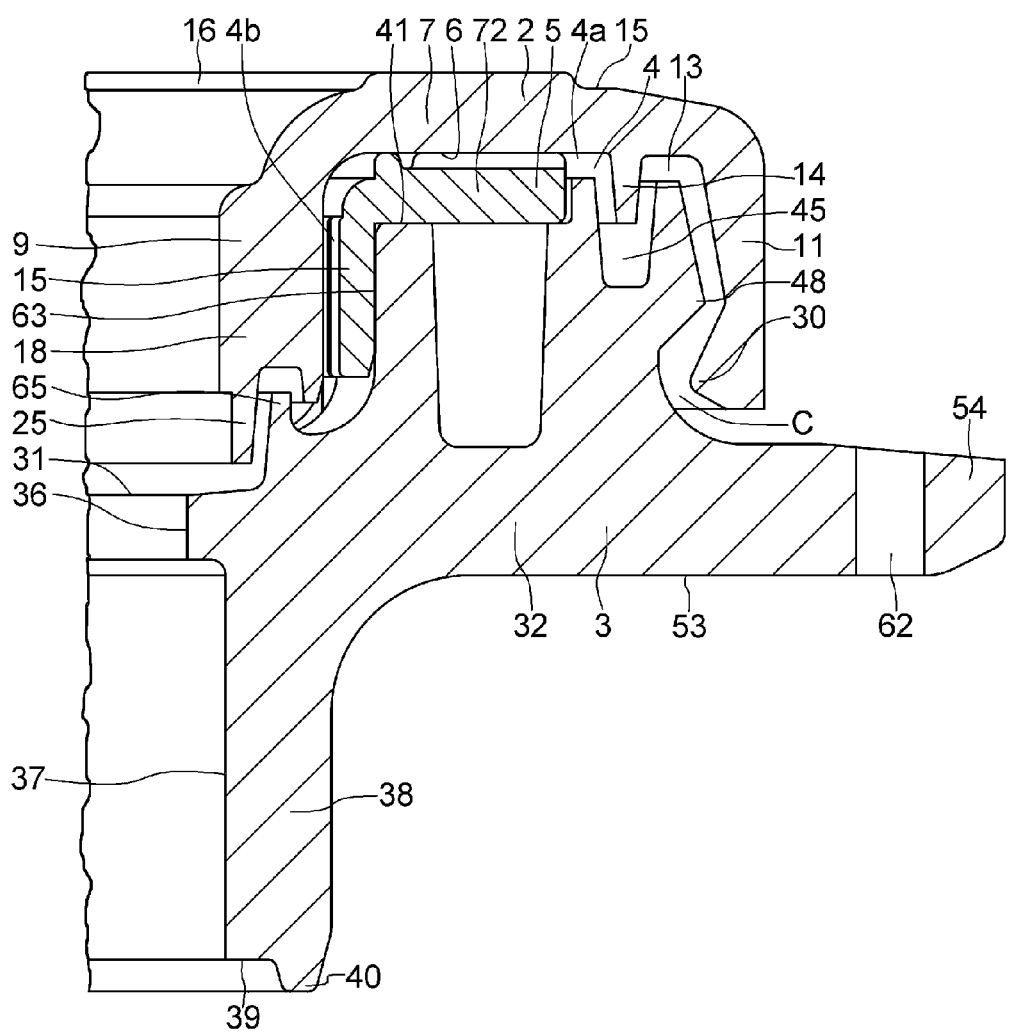
FIG. 4 is an explanatory partially enlarged cross-sectional view of the embodiment shown in FIG. 1.

In FIGS. 1 to 4, a synthetic resin-made thrust sliding bearing 1 in accordance with this embodiment for use in a strut-type suspension of a four-wheeled motor vehicle is comprised of a synthetic resin-made upper casing 2 which is fixed to a vehicle body side via a mounting member; a synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

Figure 5:
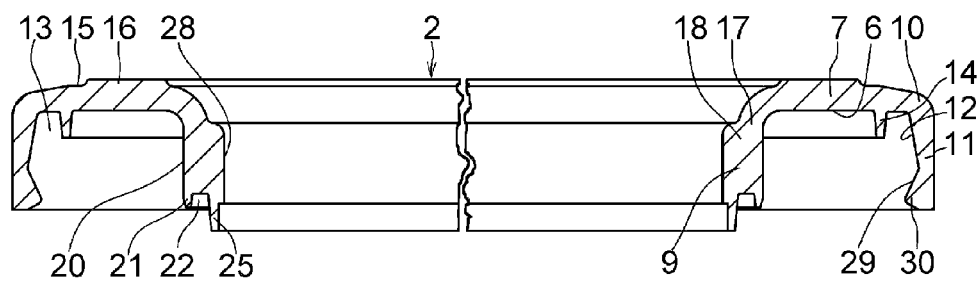
FIG. 5 is an explanatory cross-sectional view of an upper casing of the embodiment shown in FIG. 1.
Figure 6:
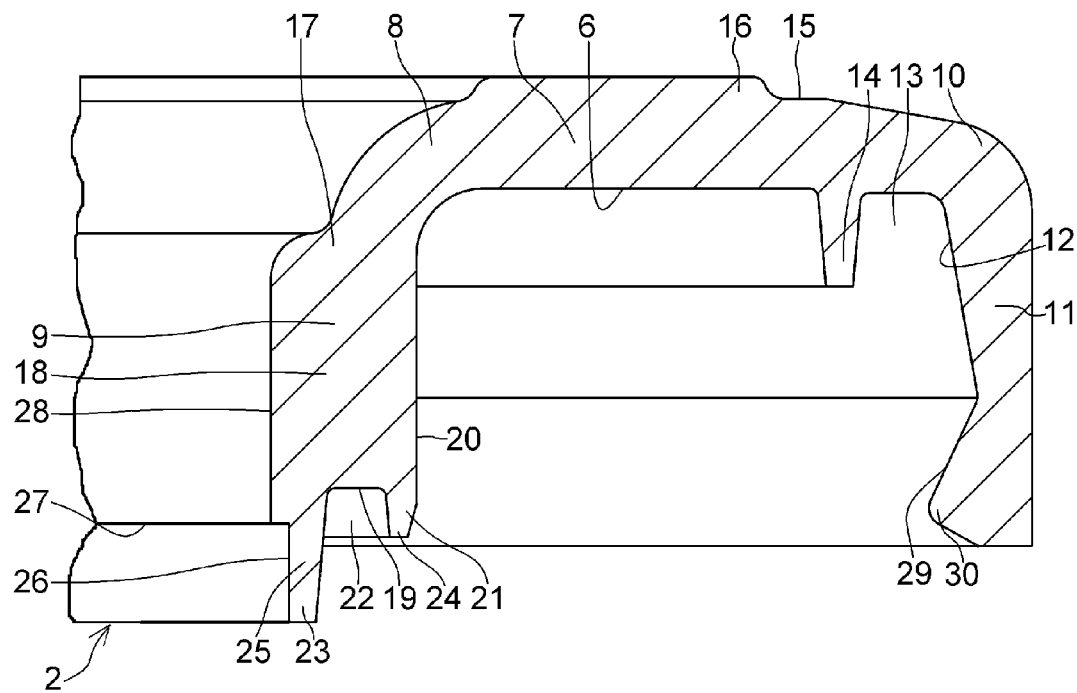
FIG. 6 is an explanatory partially enlarged cross-sectional view of the upper casing shown in FIG. 5 in the embodiment shown in FIG. 1.
Figure 7:
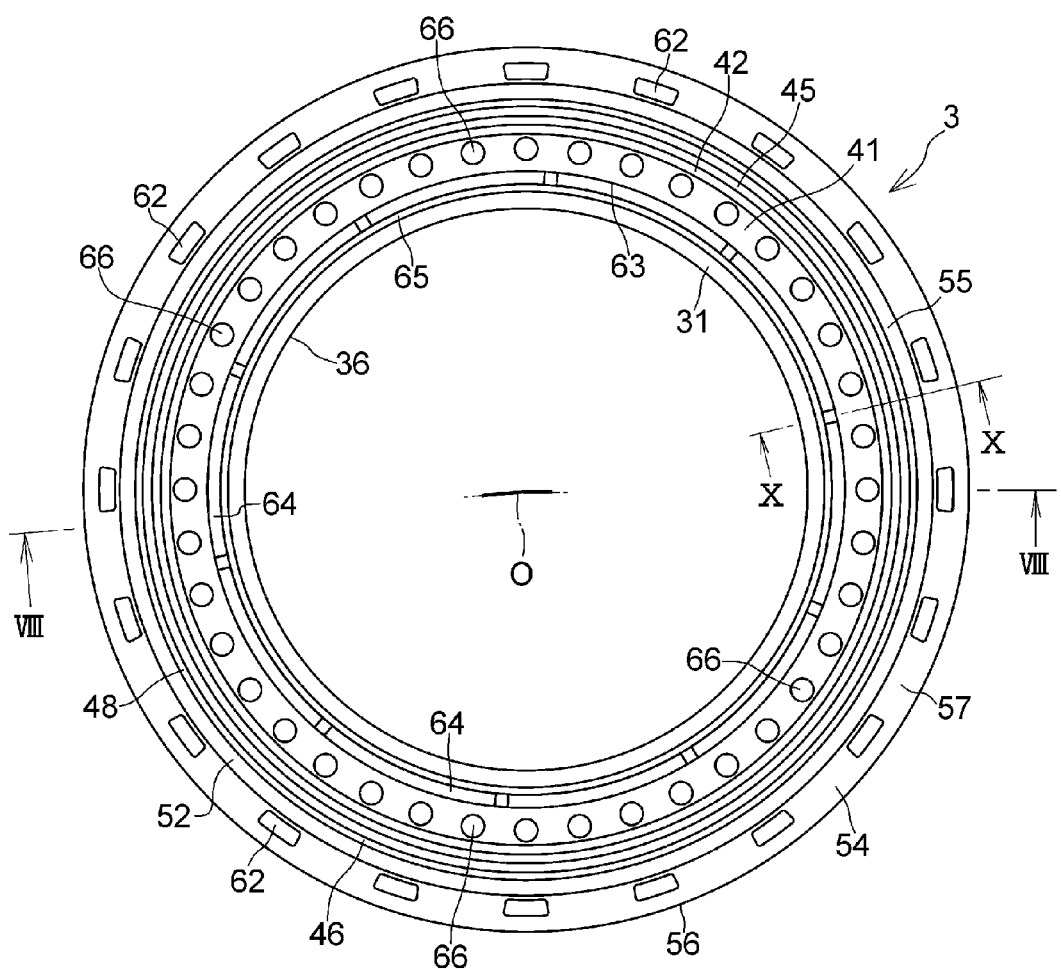
FIG. 7 is an explanatory plan view of a lower casing of the embodiment shown in FIG. 1.
Figure 8:
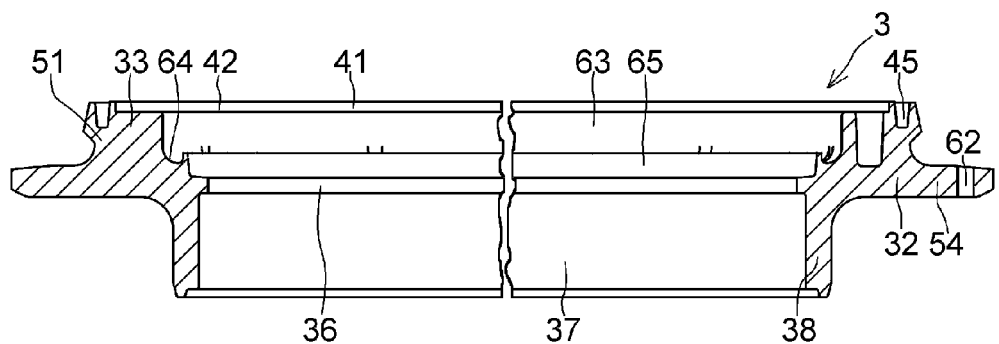
FIG. 8 is an explanatory cross-sectional view, taken in the direction of arrows along line VIII-VIII, of the lower casing shown in FIG. 7.
Figure 9:
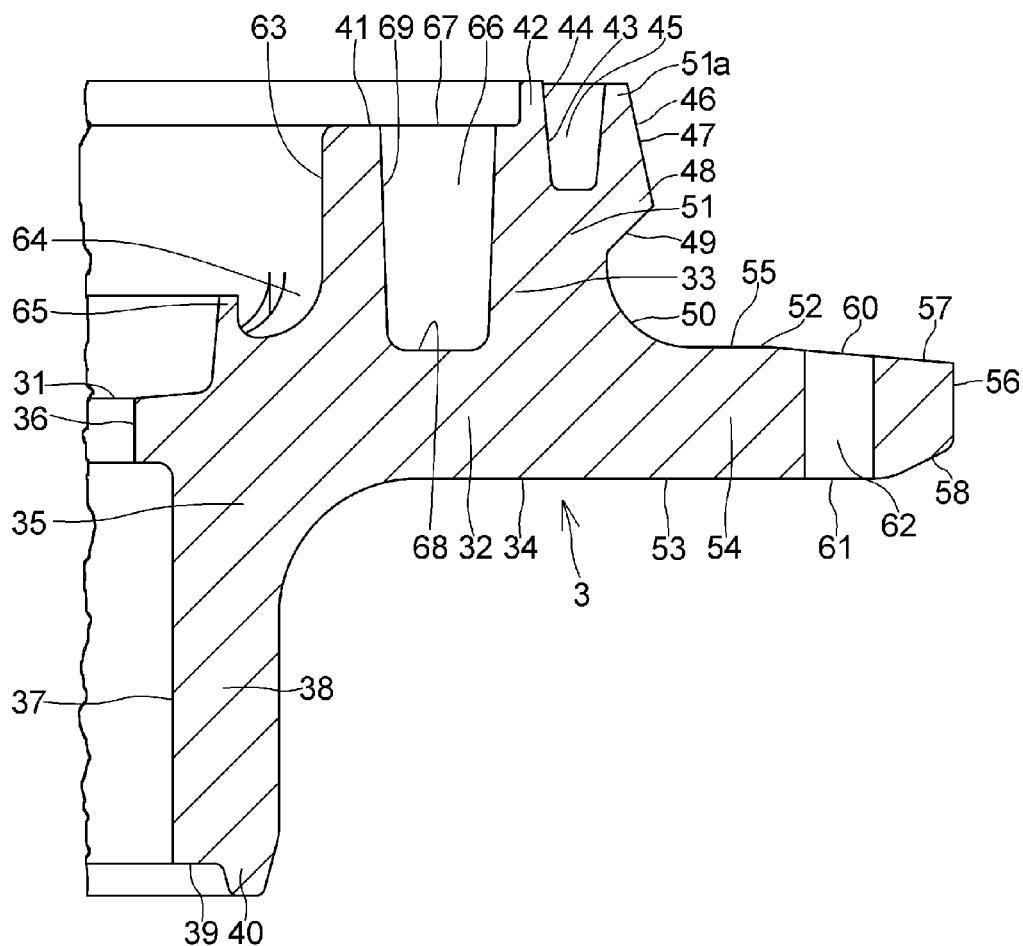
FIG. 9 is an explanatory partially enlarged cross-sectional view of the lower casing shown in FIG. 8.
Figure 10:
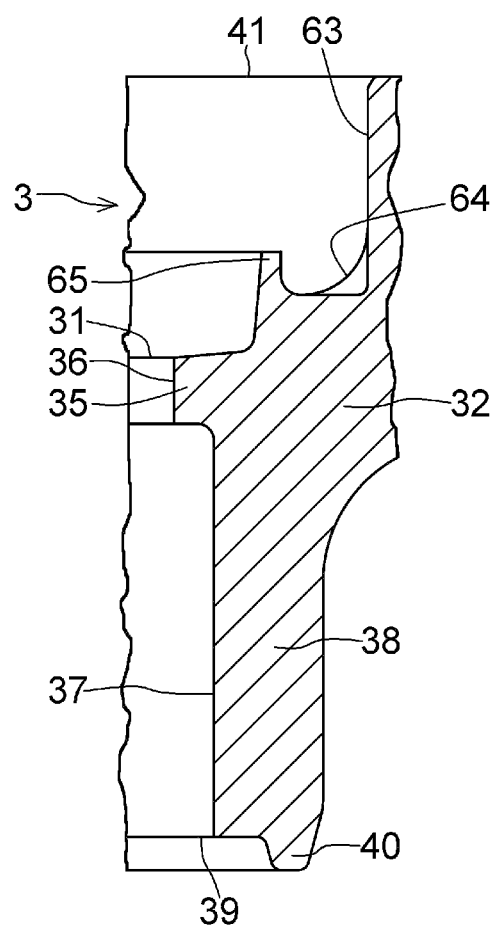
FIG. 10 is an explanatory cross-sectional view, taken in the direction of arrows X-X, of the lower casing shown in FIG. 7.
Figure 11:
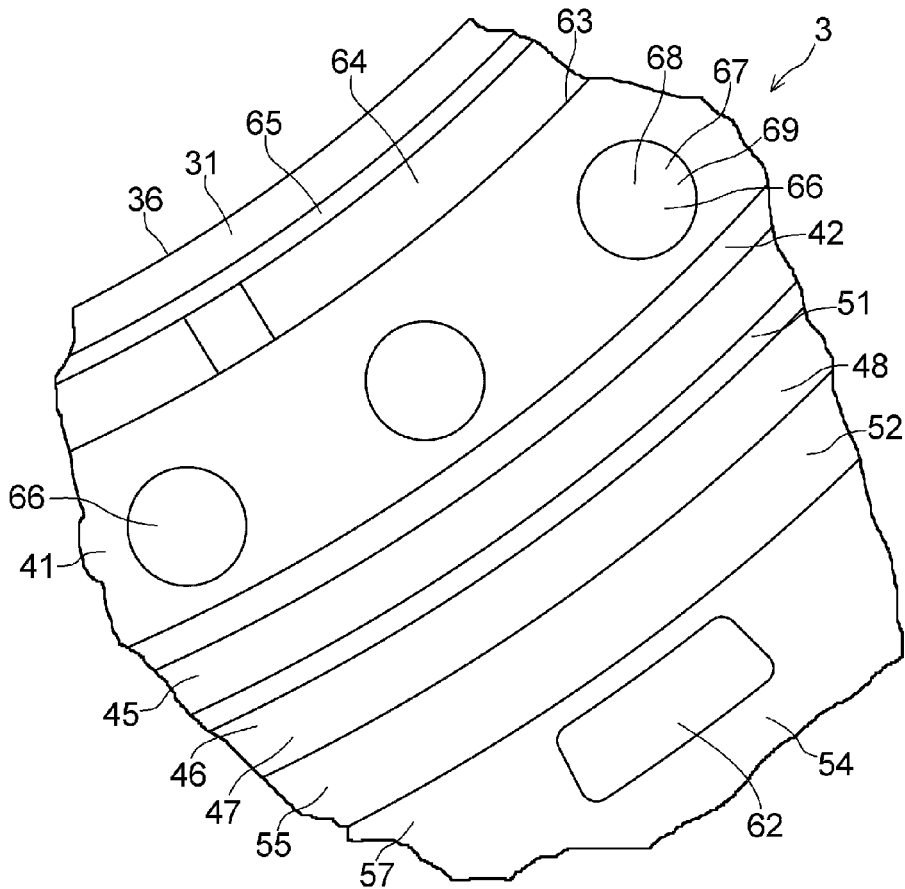
FIG. 11 is an explanatory partially enlarged plan view of the lower casing shown in FIG. 7.
Figure 12:
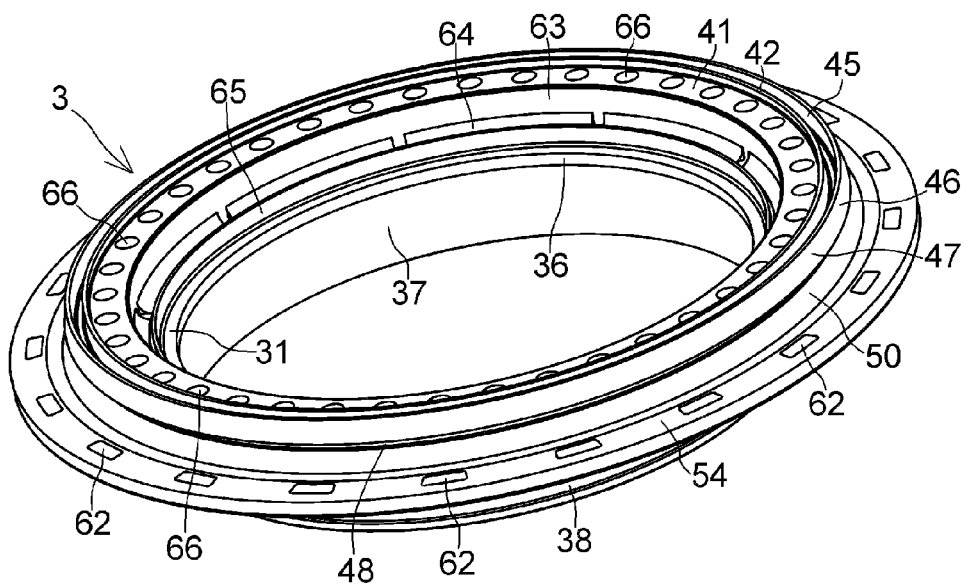
FIG. 12 is an explanatory perspective view of the lower casing shown in FIG. 7.
Figure 13:
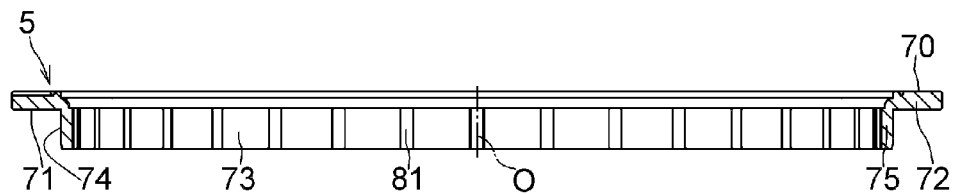
FIG. 13 is an explanatory cross-sectional view, taken in the direction of arrows XIII-XIII, of a sliding bearing piece shown in FIG. 14.
Figure 14:
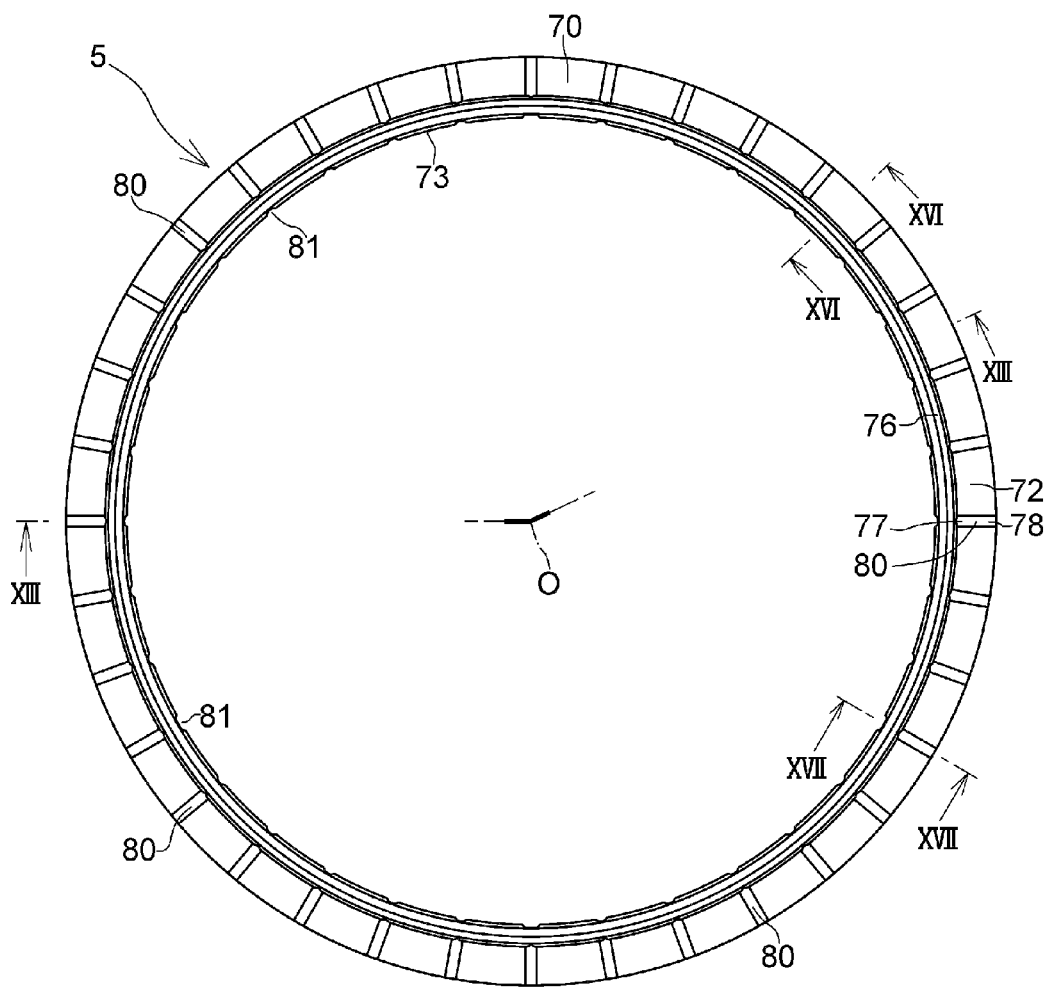
FIG. 14 is an explanatory plan view of the sliding bearing piece shown in FIG. 1.
Figure 15:
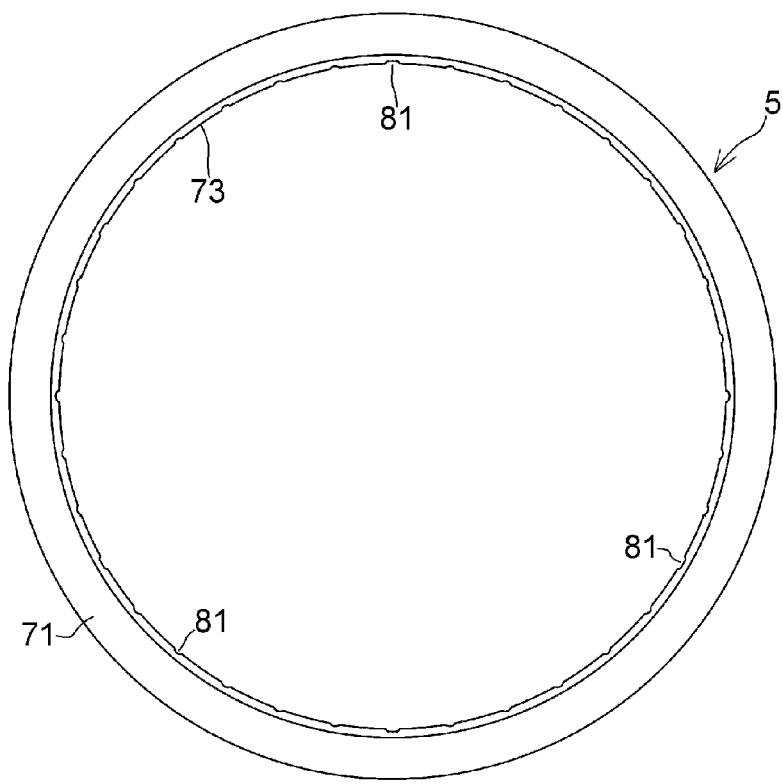
FIG. 15 is an explanatory bottom view of the sliding bearing piece shown in FIG. 1.
Figure 16:
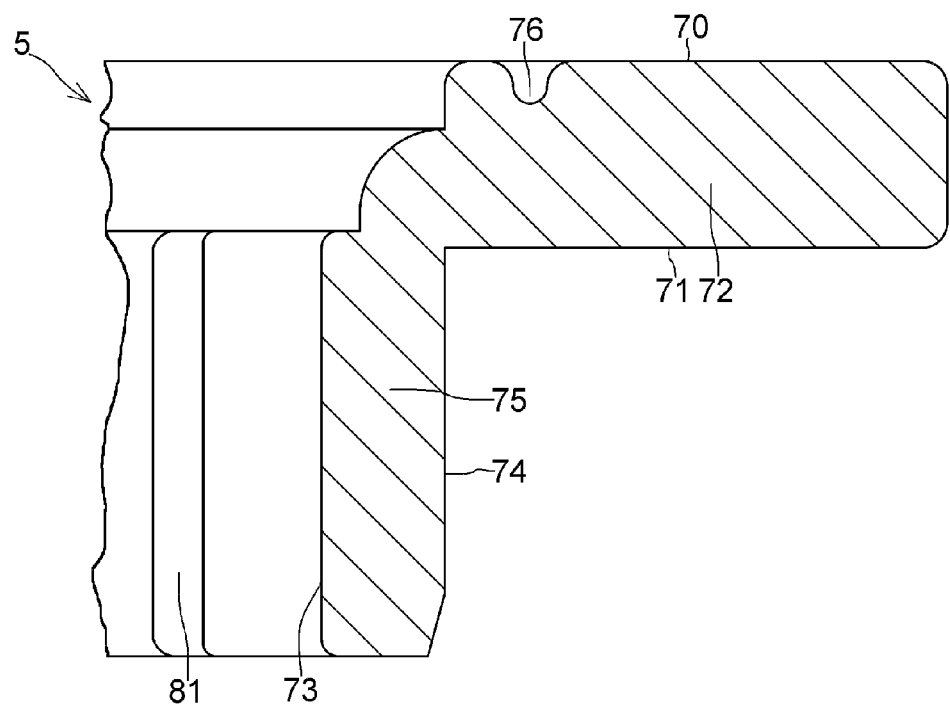
FIG. 16 is an explanatory cross-sectional view, taken in the direction of arrows along line XVI-XVI, of the sliding bearing piece shown in FIG. 14.
Figure 17:
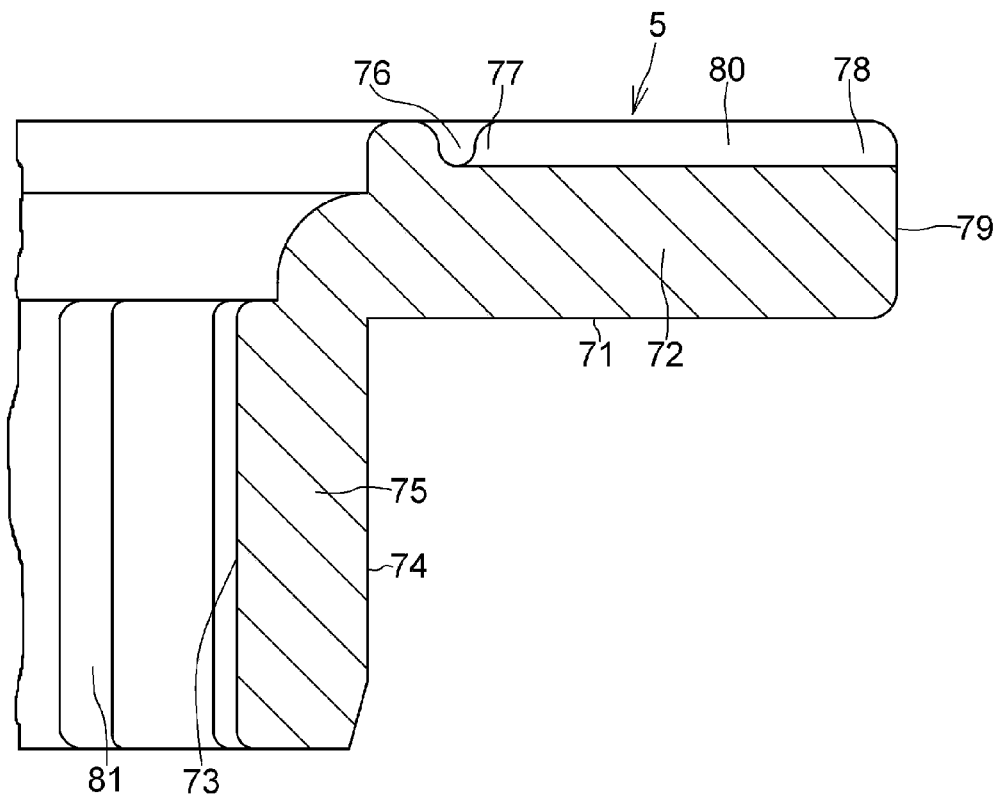
FIG. 17 is an explanatory cross-sectional view, taken in the direction of arrows along line XVII-XVII, of the sliding bearing piece shown in FIG. 14.
Figure 18:
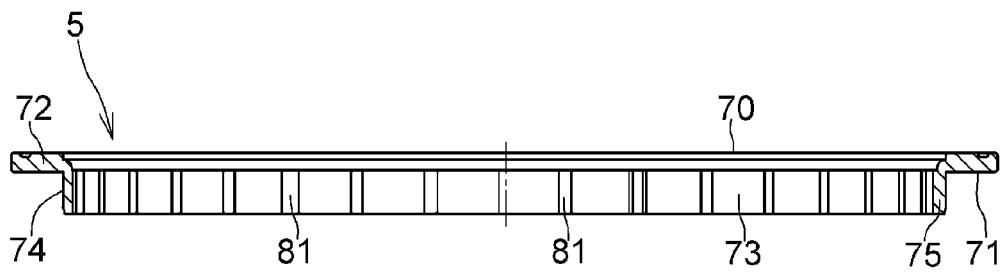
FIG. 18 is an explanatory cross-sectional view, taken in the direction of arrows along line XVIII-XVIII shown in FIG. 19, of another embodiment of the sliding bearing piece shown in FIG. 1.
Figure 19:
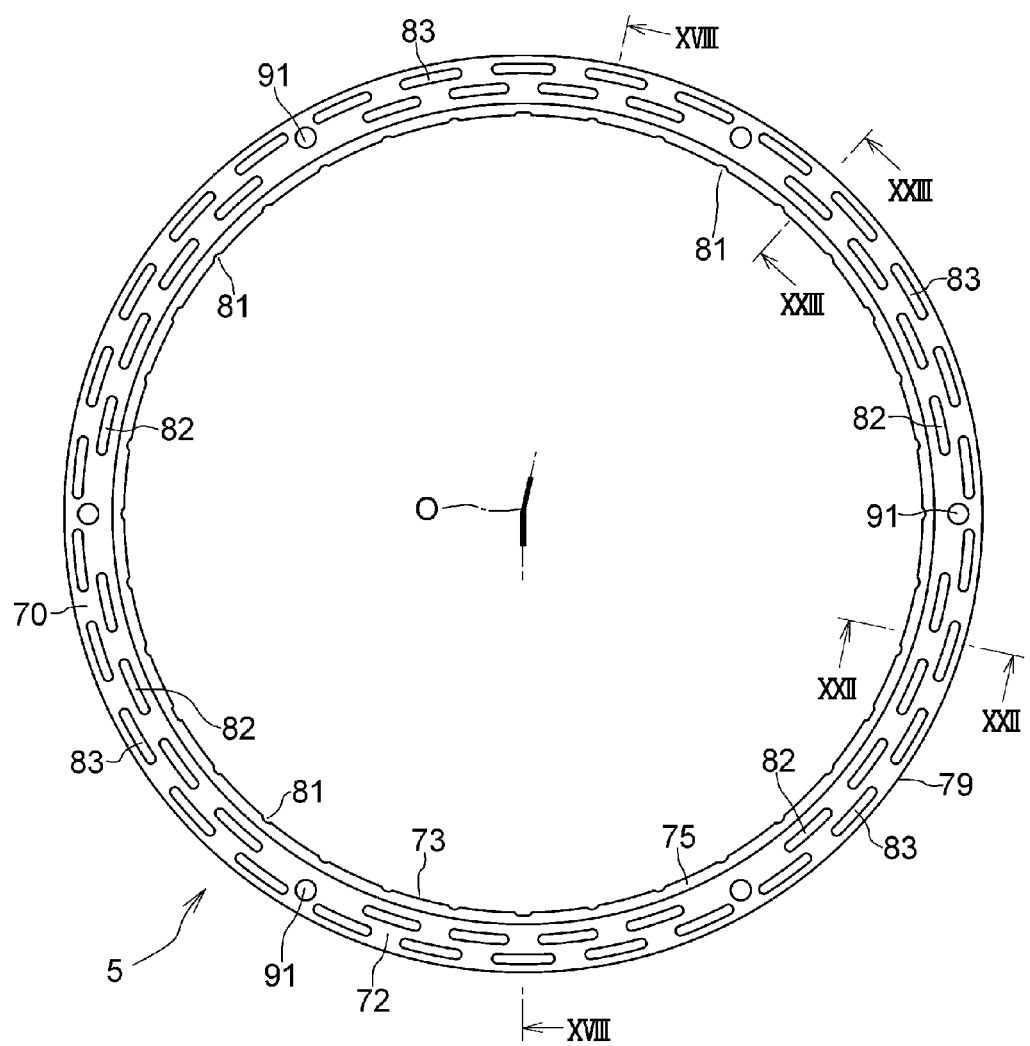
FIG. 19 is an explanatory plan view of the sliding bearing piece shown in FIG. 18.
Figure 20:
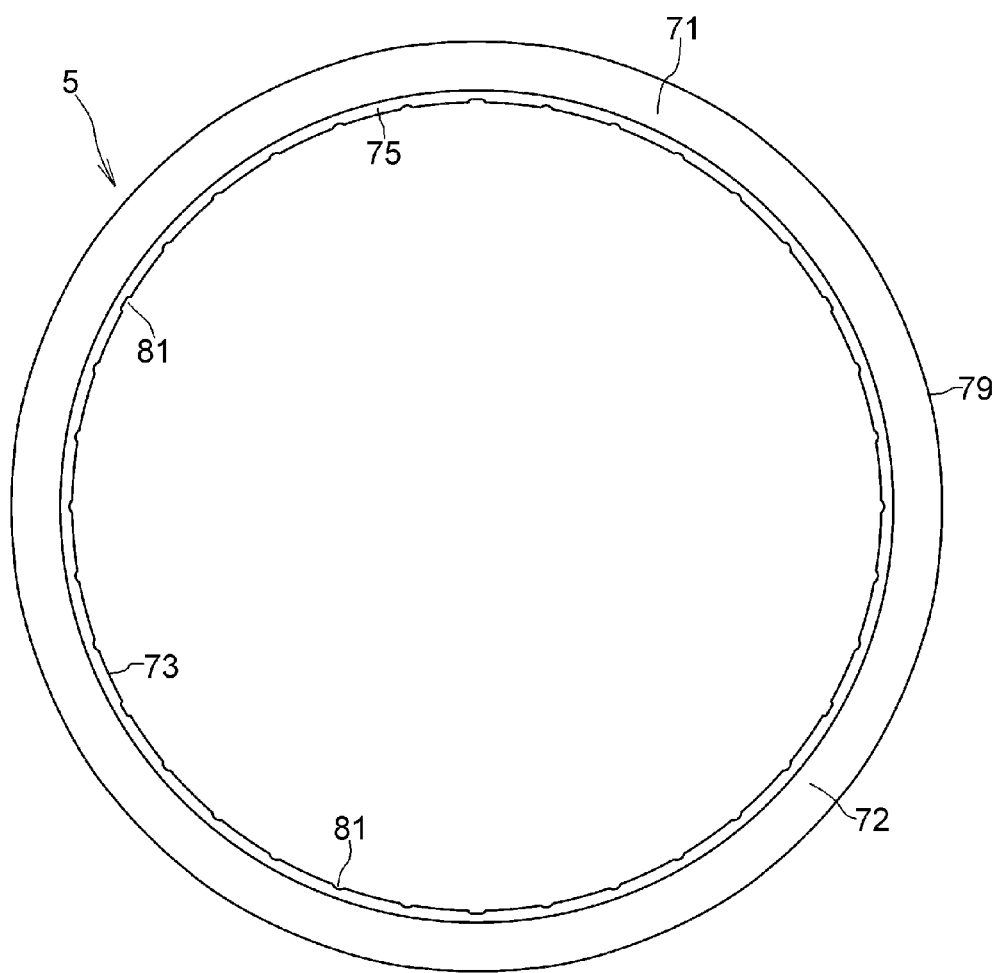
FIG. 20 is an explanatory bottom view of the sliding bearing piece shown in FIG. 18.
Figure 21:
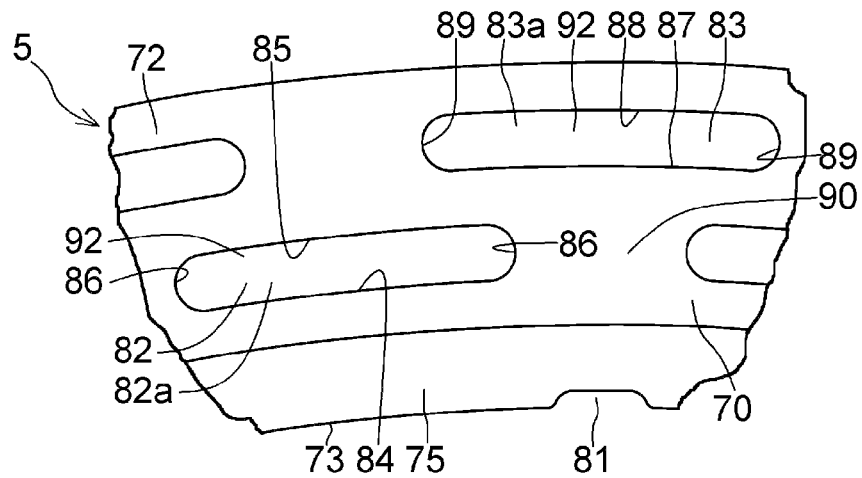
FIG. 21 is an explanatory partially enlarged plan view of the sliding bearing piece shown in FIG. 18.
Figure 22:
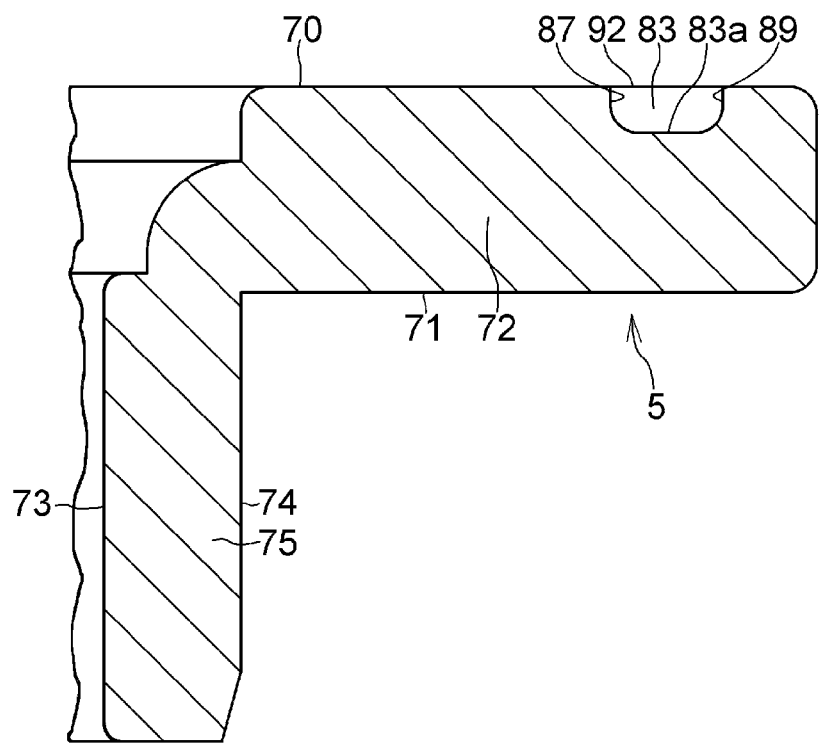
FIG. 22 is an explanatory cross-sectional view, taken in the direction of arrows along line XXII-XXII, of the sliding bearing shown in FIG. 19.
Figure 23:
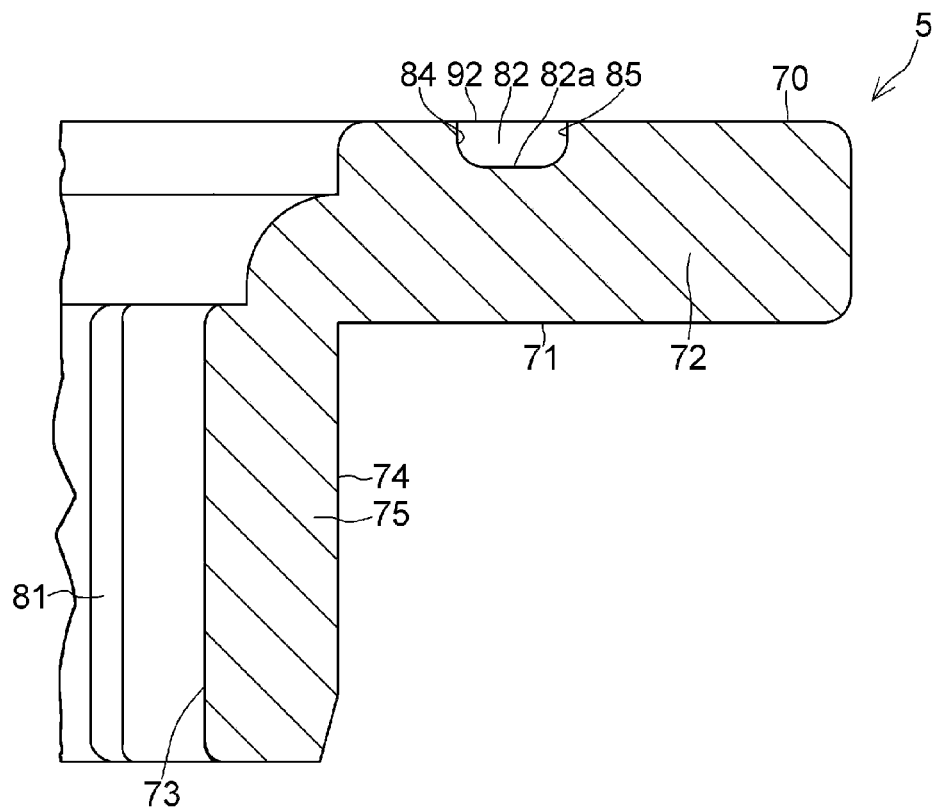
FIG. 23 is an explanatory cross-sectional view, taken in the direction of arrows along line XXIII-XXIII, of the sliding bearing shown in FIG. 19.

As particularly shown in FIGS. 5 and 6, the upper casing 2 integrally includes an annular upper casing base portion 7 having an annular lower surface 6 in an axial direction Y, an inner peripheral-side cylindrical suspended portion 9 suspended from an inner peripheral end portion 8 in the radial direction X of the upper casing base portion 7, an outer peripheral-side cylindrical suspended portion 11 suspended from an outer peripheral end portion 10 in the radial direction X of the upper casing base portion 7, an intermediate cylindrical suspended portion 14 forming an annular recessed portion 13 in cooperation with an inner peripheral surface 12 of the outer peripheral-side cylindrical suspended portion 11 and suspended downwardly in the axial direction Y from a portion on the outer peripheral-side cylindrical suspended portion 11 side in the radial direction X of the annular lower surface 6, and an annular seat portion 16 formed protrudingly on a central portion in the radial direction X of an annular upper surface 15 of the upper casing base portion 7.

The inner peripheral-side cylindrical suspended portion 9 has a thick-walled cylindrical portion 18 continuously connected at its upper end portion 17 to the inner peripheral end portion 8 in the radial direction X of the upper casing base portion 7, an outer cylindrical protrusion 21 projecting downwardly in the axial direction Y from an outer peripheral side of an annular end face 19 of the thick-walled cylindrical portion 18 and having an outer peripheral surface continuously connected to an outer peripheral surface 20 of the thick-walled cylindrical portion 18, and an inner cylindrical protrusion 25 which projects downwardly in the axial direction Y from an inner peripheral side of the annular end face 19 so as to form an annular recessed portion 22 in cooperation with an inner peripheral surface 28 of the outer cylindrical protrusion 21 and the annular end face 19, and whose distal end portion 23 is located lower than a distal end portion 24 of the outer cylindrical protrusion 21, an inner peripheral surface 26 of the inner cylindrical protrusion 25 being continuously connected to the inner peripheral surface 28 of the thick-walled cylindrical portion 18 by being reduced in diameter via a stepped annular surface 27.

The upper casing 2 further integrally has, together with the outer peripheral-side cylindrical suspended portion 11, an annular engaging hook portion 30 which protrudes inwardly in the radial direction X from an inner peripheral surface 29 of an end portion of the outer peripheral-side cylindrical suspended portion 11 in the inner peripheral surface 12.

As particularly shown in FIGS. 7 to 12, the lower casing 3 integrally includes an annular lower casing base portion 32 which has an annular upper surface 31 in the axial direction Y; a central cylindrical protruding portion 33 protruding upwardly in the axial direction Y from the annular upper surface 31 of the lower casing base portion 32; a hollow cylindrical portion 38 protruding downwardly in the axial direction Y from an inner peripheral portion 35 of an annular lower surface 34 of the lower casing base portion 31 and having an inner peripheral surface 37 which is larger in diameter than an inner peripheral surface 36 of the lower casing base portion 32; an annular protruding portion 40 protruding downwardly in the axial direction Y from an end face 39 of the hollow cylindrical portion 38; and an intermediate cylindrical protrusion 42 protruding upwardly in the axial direction Y from an outer peripheral edge of an annular upper surface 41 of the central cylindrical protruding portion 33. The hollow cylindrical portion 38 and the lower casing base portion 32 serve as a spring seat for a suspension coil spring, the annular lower surface 34 serves as an annular spring seat surface for the suspension coil spring, and an outer peripheral surface of the hollow cylindrical portion 38 is adapted to centrally position that suspension coil spring.

The lower casing 3 further integrally includes an outer cylindrical protruding portion 51 which protrudes outwardly in the radial direction X from an outer peripheral surface 43 of the central cylindrical protruding portion 33 so as to form an outer annular recessed portion 45 on the outer peripheral surface 43 of the central cylindrical protruding portion 33 in cooperation with an outer peripheral surface 44 of the intermediate cylindrical protrustion 42, and which has on its outer peripheral surface 46 an enlarged-diameter tapered surface 47 which is gradually enlarged in diameter toward a lower side in the axial direction X, a reduced-diameter tapered surface 49 which is continuously connected to the enlarged-diameter tapered surface 47, forms in cooperation with that enlarged-diameter tapered surface 47 an annular engaged hook portion 48 projecting outwardly in the radial direction X, and is gradually reduced in diameter toward the lower side in the axial direction Y, and a curved recessed surface 50 continuously connected to the reduced-diameter tapered surface 49; and a wide annular flange portion 54 which is formed on the outer peripheral surface 43 of the central cylindrical protruding portion 33 in such a manner as to extend outwardly in the radial direction X such that its upper surface 52 is continuously connected to the curved recessed surface 50 and its lower surface 53 is flush with the annular lower surface 34 of the lower casing base portion 32.

The upper surface 52 of the wide annular flange portion 54 has an annular flat surface portion 55 which is continuously connected to the curved recessed surface 50 and a tapered surface portion 57 which is continuously connected to the annular flat surface portion 55 and having a downward gradient extending toward an outer peripheral surface 56 of the annular flange portion 54. The lower surface 53 of the annular flange portion 54 is continuously connected to the outer peripheral surface 56 via a tapered surface portion 58 having a downward gradient extending toward the lower surface 53.

In the outer peripheral edge side of the wide annular flange portion 54, a plurality of through holes 62 each having one end 60 open at the tapered surface portion 57 and another end 61 open at the lower surface 53 are formed along the circumferential direction R. As illustrated in the drawings, the through holes 62 may be rectangular in a plan view, or may have other shapes such as circular or elliptical shapes in a plan view.

The central cylindrical protruding portion 33 has a cylindrical inner peripheral surface 63 in the radial direction X which is continuously connected to the annular upper surface 41 thereof and a curved recessed surface portion 64 which is continuously connected to a lower end of the cylindrical inner peripheral surface 63 and is discontinuous in the circumferential direction R. The lower casing 3 further includes a cylindrical inner cylindrical protrusion 65 which is located radially inwardly of the central cylindrical protruding portion 33 and protrudes upwardly in the axial direction Y from the annular upper surface 31 of the lower casing base portion 32.

A plurality of hole portions 66 are formed in the annular upper surface 41 of the central cylindrical protruding portion 33 along the circumferential direction R in such a manner as to extend downwardly in the axial direction Y. Each of the hole portions 66, which is open at a circular opening portion 67, is defined by bottom surface 68 and a truncated conical surface 69 which is tapered from the circular opening portion 67 to the bottom surface 68. These hole portions 66 are provided so as to reduce as practically as possible defects such as sink marks during molding by rendering uniform the thickness of the central cylindrical protruding portion 33 of the lower casing 3 and the thickness of other portions of the lower casing 3.

As particularly shown in FIGS. 13 to 17, the synthetic resin-made sliding bearing piece 5 disposed in the space 4 includes an annular thrust sliding bearing piece portion 72 having an annular upper surface 70 in the axial direction Y which is brought into slidable contact with the annular lower surface 6 of the upper casing base portion 7 and an annular lower surface 71 in the axial direction Y which is brought into contact with the annular upper surface 41 of the central cylindrical protruding portion 33, as well as a cylindrical radial sliding bearing piece portion 75 which, at its one annular end portion, is integrally formed on one annular end portion of the thrust sliding bearing piece portion 72 in such a manner as to extend from that one end portion downwardly in the axial direction Y and has a cylindrical inner peripheral surface 73 in the radial direction X which is brought into slidable contact with the outer peripheral surface 20 of the thick-walled cylindrical portion 18 of the inner peripheral-side cylindrical suspended portion 9 and a cylindrical outer peripheral surface 74 in the radial direction X which is brought into contact with the cylindrical inner peripheral surface 63 of the central cylindrical protruding portion 33.

The thrust sliding bearing piece portion 72, which is disposed in the space 4, i.e., an annular space 4a between the annular lower surface 6 of the upper casing base portion 7 and the annular upper surface 41 of the central cylindrical protruding portion 33, has an annular groove 76 provided on an inner peripheral side of the annular upper surface 70 and a plurality of radial grooves 80 which are open at their one ends 77 to the annular groove 76 and are open at their other ends 78 to an outer peripheral surface 79, and which are formed on the upper surface 70 by being spaced apart at equal intervals in the circumferential direction R. The radial sliding bearing piece portion 75, which is disposed in the space 4, i.e., a cylindrical space 4b between the outer peripheral surface 20 of the thick-walled cylindrical portion 18 of the inner peripheral-side cylindrical suspended portion 9 and the cylindrical inner peripheral surface 63 of the central cylindrical protruding portion 33, has a plurality of axial grooves 81 which are open at their both ends and are formed on the cylindrical inner peripheral surface 73 by being spaced apart at equal intervals along the circumferential direction R. The annular groove 76, the radial grooves 80, and the axial grooves 81 serve as a sump section for lubricating oil such as grease.

The upper casing 2 is superposed on the lower casing 3 so as to be rotatable about the axis O in the circumferential direction R, such that an outer sealing portion for performing labyrinth action is formed by disposing the intermediate cylindrical suspended portion 14 in the outer annular recessed portion 45 of the lower casing 3 and by disposing an upper end portion 51a in the axial direction Y of the outer cylindrical protruding portion 51 in the annular recessed portion 13, while an inner sealing portion for performing labyrinth action is formed between a lower portion in the axial direction Y of the inner peripheral-side cylindrical suspended portion 18 and the cylindrical inner peripheral surface 63 of the central cylindrical protruding portion 33 by disposing the annular protrusion 65 in the annular recessed portion 22, and such that the engaging hook portion 30 is resiliently fitted to the engaged hook portion 48. An annular clearance C, which is formed by the curved recessed surface 50 and the engaging hook portion 30 in a resiliently fitting section including the engaging hook portion 30 and the engaged hook portion 48, is covered by the wide annular flange portion 54 of the lower casing 3 downward in the axial direction Y.

According to the above-described sliding bearing 1, the relative rotation in the circumferential direction R of the lower casing 3 with respect to the upper casing 2 is allowed by the relative sliding in the circumferential direction R of each of the upper surface 70 of the thrust sliding bearing piece portion 72 with respect to the annular lower surface 6 of the upper casing base portion 7 and the inner peripheral surface 73 of the radial sliding bearing piece portion 75 with respect to the outer peripheral surface 20 of the thick-walled cylindrical portion 18.

Since the annular clearance C formed between the curved recessed surface 50 and the engaging hook portion 30 is covered by the wide annular flange portion 54 with respect to the axial direction Y, even in cases where cleaning with a high-pressure water jet of a high-pressure washing machine is performed to remove the contamination caused by muddy water or the like at the undercarriage of the motor vehicle, the ingress of the cleaning water into the annular space 4a, i.e., the interior of the sliding bearing 1, is prevented as practically as possible, so that trouble ascribable to the ingress of the cleaning water into the interior of the sliding bearing 1 does not occur.

Meanwhile, as shown in FIGS. 18 to 23, in the synthetic resin-made sliding bearing piece 5 including the annular thrust sliding bearing piece portion 72 having the annular upper surface 70 which is brought into slidable contact with the annular lower surface 6 of the upper casing base portion 7 and the annular lower surface 71 which is brought into contact with the annular upper surface 41 of the central cylindrical protruding portion 33 of the lower casing 3, as well as the cylindrical radial sliding bearing piece portion 75 which, at its one annular end portion, is integrally formed on the one annular end portion of the thrust sliding bearing piece portion 72 in such a manner as to extend downwardly in the axial direction Y and has the cylindrical inner peripheral surface 73 which is brought into slidable contact with the outer peripheral surface 20 of the thick-walled cylindrical portion 18 of the inner peripheral-side cylindrical suspended portion 9 of the upper casing 2 and the cylindrical outer peripheral surface 74 which is brought into contact with the cylindrical inner peripheral surface 63 of the central cylindrical protruding portion 33 of the lower casing 3, the thrust sliding bearing piece portion 72 may have pluralities of inner recessed portions 82 and outer recessed portions 83 which are formed on the annular upper surface 70 along the circumferential direction R and in at least two rows including an inner row and an outer row in the radial direction X.

Each of the inner recessed portions 82 formed in the inner row is defined by an inner circular arc-shaped wall surface 84 which extends in a circular arc shape about the axis O as the center; an outer circular arc-shaped wall surface 85 which extends in a circular arc shape about the axis O as the center outwardly of the inner circular arc-shaped wall surface 84 in the radial direction X, i.e., whose diameter is enlarged in the radial direction X relative to the inner circular arc-shaped wall surface 84; a pair of semicircular wall surfaces 86 respectively continuously connected to the inner circular arc-shaped wall surface 84 and the outer circular arc-shaped wall surface 85 and opposed to each other in the circumferential direction R; and a bottom wall surface 82a continuously connected to respective ones of the inner circular arc-shaped wall surface 84, the outer circular arc-shaped wall surface 85, and the pair of semicircular wall surfaces 86.

Each of the outer recessed portions 83 formed in the outer row is defined by an inner circular arc-shaped wall surface 87 which extends in a circular arc shape about the axis O as the center; an outer circular arc-shaped wall surface 88 which extends in a circular arc shape about the axis O as the center outwardly of the inner circular arc-shaped wall surface 87 in the radial direction X, i.e., whose diameter is enlarged in the radial direction X relative to the inner circular arc-shaped wall surface 87; a pair of semicircular wall surfaces 89 respectively continuously connected to the inner circular arc-shaped wall surface 84 and the outer circular arc-shaped wall surface 88 and opposed to each other in the circumferential direction R; and a bottom wall surface 83a continuously connected to respective ones of the inner circular arc-shaped wall surface 87, the outer circular arc-shaped wall surface 88, and the pair of semicircular wall surfaces 89. Each outer recessed portion 83 is arranged at a position corresponding to a discontinuous portion 90 in the circumferential direction R between adjacent ones of the inner recessed portions 82 formed in the inner row. Thus, the inner recessed portions 82 and the outer recessed portions 83 are arranged with phase differences with respect to each other in the circumferential direction R.

Small circular portions 91 which are arranged at intervals of 60° along the circumferential direction R indicate positions of projecting pins at the time of the molding of the sliding bearing piece 5, and are not arranged in the inner recessed portions 82.

The pluralities of inner recessed portions 82 and outer recessed portions 83, which are formed on the annular upper surface 70 of the thrust sliding bearing piece portion 72 along the circumferential direction R and in at least two rows including the inner row and the outer row in the radial direction X, are arranged such that the ratio of the total area of opening surfaces 92 of the inner recessed portions 82 and the outer recessed portions 83 in total surfaces which combine the opening surfaces 92 of the inner recessed portions 82 and the outer recessed portions 83 and the annular upper surface 70 of the thrust sliding bearing piece portion 72, i.e., a thrust sliding bearing surface, is 20 to 50%, preferably 30 to 40%.

The radial sliding bearing piece portion 75 shown in FIGS. 18 to 23 may also have the plurality of axial grooves 81 which are open at their both ends in the axial direction Y and are provided on the cylindrical inner peripheral surface 73 by being spaced apart at equal intervals in the circumferential direction R.

The pluralities of inner recessed portions 82 and outer recessed portions 83, which are formed in the annular upper surface 70 of the thrust sliding bearing piece portion 72 along the circumferential direction R and in at least two rows including the inner row and the outer row in the radial direction X, as well as the axial grooves 81, serve as a sump section for lubricating oil such as grease.

According to the thrust sliding bearing piece portion 72 of the sliding bearing piece 5 thus formed, since the inner recessed portions 82 and the outer recessed portions 83 are formed in the annular upper surface 70, the area of contact between the annular upper surface 70, which is the thrust sliding bearing surface and serves as the sliding surface, and the mating member, i.e., the annular lower surface 6 of the upper casing base portion 7 is reduced in the relative rotation in the circumferential direction R about the axis O between the annular upper surface 70 of the thrust sliding bearing piece portion 72 and the annular lower surface 6 of the upper casing base portion 7. This makes it possible to increase the surface pressure (load per unit area) acting on the annular upper surface 70, thereby making it possible to attain further lower friction through a combination of the lower friction due to the friction between the synthetic resins and the lower friction due to the presence on the sliding surfaces of the lubricating oil which is filled in the inner recessed portions 82 and the outer recessed portions 83.

Figure 24:
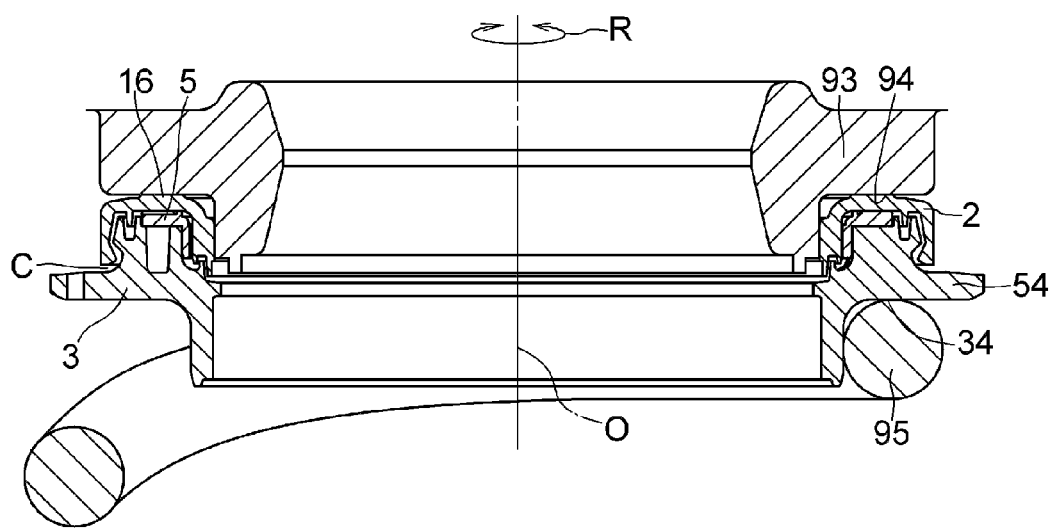
FIG. 24 is an explanatory cross-sectional view in which the sliding bearing shown in FIG. 1 is incorporated in a strut-type suspension.

As shown in FIG. 24, for example, the synthetic resin-made sliding bearing 1 in accordance with this embodiment may be applied to a strut-type suspension in a four-wheeled motor vehicle by disposing the synthetic resin-made sliding bearing 1 in accordance with this embodiment between a vehicle body-side bearing surface 94 of a vehicle body-side mounting member 93 and an upper end portion of a suspension coil spring 95 such that the seat portion 16 of the upper casing 2 is abutted against the vehicle body-side bearing surface 94 of the vehicle body-side mounting member 93, and such that the annular lower surface 34 of the lower casing base portion 32 as a spring bearing surface is abutted against the upper end portion of the suspension coil spring 95.

In the strut-type suspension shown in FIG. 24, the relative rotation in the circumferential direction R of the suspension coil spring 95 with respect to the vehicle body-side mounting member 93 is allowed in the sliding bearing 1 by the relative sliding in the circumferential direction R of each of the upper surface 70 of the thrust sliding bearing piece portion 72 with respect to the annular lower surface 6 of the upper casing base portion 7 and the inner peripheral surface 73 of the radial sliding bearing piece portion 75 with respect to the outer peripheral surface 20 of the thick-walled cylindrical portion 18.

In addition, since the annular clearance C formed between the curved recessed surface 50 and the engaging hook portion 30 in the resiliently fitting section is covered with respect to the axial direction X by the wide annular flange portion 54 formed integrally on the outer peripheral surface 44 of the central cylindrical protruding portion 33, even in cases where cleaning with a high-pressure water jet of a high-pressure washing machine is performed to remove the contamination caused by muddy water or the like at the undercarriage of the motor vehicle, the ingress of the cleaning water into the space 4, i.e., the interior of the sliding bearing 1, particularly into annular space 4a, is prevented as practically as possible, so that trouble ascribable to the ingress of the cleaning water into the interior of the sliding bearing 1 does not occur.

The invention claimed is:

1. A synthetic resin-made thrust sliding bearing comprising: a synthetic resin-made upper casing, a synthetic resin-made lower casing superposed on said upper casing, and a synthetic resin-made sliding bearing piece disposed in a space between said upper casing and said lower casing,
    wherein said upper casing integrally includes: an upper casing base portion; an inner peripheral-side cylindrical suspended portion; an outer peripheral-side cylindrical suspended portion and an engaging hook portion which protrudes radially inwardly from an inner peripheral surface of an end portion of the outer peripheral-side cylindrical suspended portion,
    wherein said lower casing integrally includes: a lower casing base portion; a central cylindrical protruding portion; an engaged hook portion provided on an outer peripheral surface of the central cylindrical protruding portion; and a wide annular flange portion which is formed on the outer peripheral surface of the central cylindrical protruding portion,
    wherein said upper casing is superposed on said lower casing such that the engaging hook portion is resiliently fitted to the engaged hook portion,
    wherein a clearance in a resiliently fitting section including the engaging hook portion and the engaged hook portion is covered by the wide annular flange portion of said lower casing downward in an axial direction,
    wherein said sliding bearing piece includes: a thrust sliding bearing piece portion; and a radial sliding bearing piece portion,
    wherein said thrust sliding bearing piece portion has an annular groove and a plurality of radial grooves, and
    wherein said radial sliding bearing piece portion has a plurality of axial grooves.

2. The synthetic resin-made sliding bearing according to claim 1, wherein said upper casing is combined with said lower casing such that an inner sealing portion for performing labyrinth action is formed between an axial lower portion of the inner peripheral-side cylindrical suspended portion and an inner peripheral surface of the central cylindrical protruding portion.

3. The synthetic resin-made sliding bearing according to claim 1, wherein a plurality of through holes are formed in an outer peripheral edge side of the wide annular flange portion.

4. A synthetic resin-made thrust sliding bearing comprising: a synthetic resin-made upper casing, a synthetic resin-made lower casing superposed on said upper casing, and a synthetic resin-made sliding bearing piece disposed in a space between said upper casing and said lower casing,
    wherein said upper casing integrally includes: an upper casing base portion; an inner peripheral-side cylindrical suspended portion; an outer peripheral-side cylindrical suspended portion; and an engaging hook portion which protrudes radially inwardly from an inner peripheral surface of an end portion of the outer peripheral-side cylindrical suspended portion,
    wherein said lower casing integrally includes: a lower casing base portion; a central cylindrical protruding portion; an engaged hook portion provided on an outer peripheral surface of the central cylindrical protruding portion; and a wide annular flange portion which is formed on the outer peripheral surface of the central cylindrical protruding portion,
    wherein said upper casing is superposed on said lower casing such that the engaging hook portion is resiliently fitted to the engaged hook portion,
    wherein a clearance in a resiliently fitting section including the engaging hook portion and the engaged hook portion is covered by the wide annular flange portion of said lower casing downward in an axial direction, and
    wherein a plurality of through holes are formed in an outer peripheral edge side of the wide annular flange portion.

5. The synthetic resin-made sliding bearing according to claim 4, wherein said upper casing is combined with said lower casing such that an inner sealing portion for performing labyrinth action is formed between an axial lower portion of the inner peripheral-side cylindrical suspended portion and an inner peripheral surface of the central cylindrical protruding portion.

6. The synthetic resin-made sliding bearing according to claim 4, wherein said sliding bearing piece includes: a thrust sliding bearing piece portion; and a radial sliding bearing piece portion.

7. The synthetic resin-made sliding bearing according to claim 6,
    wherein said thrust sliding bearing piece portion has an annular groove and a plurality of radial grooves, and
    wherein said radial sliding bearing piece portion has a plurality of axial grooves.

8. The synthetic resin-made sliding bearing according to claim 6,
    wherein the thrust sliding bearing piece portion has pluralities of inner recessed portions and outer recessed portions which are formed in at least two rows including an inner row and an outer row,
    wherein said inner recessed portions and said outer recessed portions are arranged with phase differences, and
    wherein said radial sliding bearing piece portion has a plurality of axial grooves.

9. The synthetic resin-made sliding bearing according to claim 8, wherein each of the plurality of inner recessed portions is defined by an inner circular arc-shaped wall surface; an outer circular arc-shaped wall surface; a pair of semicircular wall surfaces; and a bottom wall surface.

10. The synthetic resin-made sliding bearing according to claim 8, wherein each of the plurality of outer recessed portions is defined by an inner circular arc-shaped wall surface; an outer circular arc-shaped wall surface; a pair of semicircular wall surfaces; and a bottom wall surface.

11. The synthetic resin-made sliding bearing according to claim 8, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

12. A synthetic resin-made thrust sliding bearing comprising: a synthetic resin-made upper casing, a synthetic resin-made lower casing superposed on said upper casing, and a synthetic resin-made sliding bearing piece disposed in a space between said upper casing and said lower casing, wherein said upper casing integrally includes: an upper casing base portion; an inner peripheral-side cylindrical suspended portion; an outer peripheral-side cylindrical suspended portion; and an engaging hook portion which protrudes radially inwardly from an inner peripheral surface of an end portion of the outer peripheral-side cylindrical suspended portion, wherein said lower casing integrally includes: a lower casing base portion; a central cylindrical protruding portion; an engaged hook portion provided on an outer peripheral surface of the central cylindrical protruding portion; and a wide annular flange portion which is formed on the outer peripheral surface of the central cylindrical protruding portion, wherein said upper casing is superposed on said lower casing such that the engaging hook portion is resiliently fitted to the engaged hook portion, wherein a clearance in a resiliently fitting section including the engaging hook portion and the engaged hook portion is covered by the wide annular flange portion of said lower casing downward in an axial direction, wherein said sliding bearing piece includes: a thrust sliding bearing piece portion; and a radial sliding bearing piece portion, wherein said thrust sliding bearing piece portion has pluralities of inner recessed portions and outer recessed portions which are formed in at least two rows including an inner row and an outer row, wherein said inner recessed portions and said outer recessed portions are arranged with phase differences with respect to each other, wherein radial sliding bearing piece portion has a plurality of axial grooves, and wherein each of the plurality of inner recessed portions is defined by an inner circular arc-shaped wall surface; an outer circular arc-shaped wall surface; a pair of semicircular wall surfaces; and a bottom wall surface.

13. The synthetic resin-made sliding bearing according to claim 12, wherein said upper casing is combined with said lower casing such that an inner sealing portion for performing labyrinth action is formed between an axial lower portion of the inner peripheral-side cylindrical suspended portion and an inner peripheral surface of the central cylindrical protruding portion.

14. The synthetic resin-made sliding bearing according to claim 12, wherein a plurality of through holes are formed in an outer peripheral edge side of the wide annular flange portion.

15. The synthetic resin-made sliding bearing according to claim 12, wherein each of the plurality of outer recessed portions is defined by an inner circular arc-shaped wall surface; an outer circular arc-shaped wall surface; a pair of semicircular wall surfaces; and a bottom wall surface.

16. A The synthetic resin-made sliding bearing according to claim 12, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

17. A synthetic resin-made thrust sliding bearing comprising: a synthetic resin-made upper casing, a synthetic resin-made lower casing superposed on said upper casing, and a synthetic resin-made sliding bearing piece disposed in a space between said upper casing and said lower casing, wherein said upper casing integrally includes: an upper casing base portion; an inner peripheral-side cylindrical suspended portion; an outer peripheral-side cylindrical suspended portion; and an engaging hook portion which protrudes radially inwardly from an inner peripheral surface of an end portion of the outer peripheral-side cylindrical suspended portion, wherein said lower casing integrally includes: a lower casing base portion; a central cylindrical protruding portion; an engaged hook portion provided on an outer peripheral surface of the central cylindrical protruding portion; and a wide annular flange portion which is formed on the outer peripheral surface of the central cylindrical protruding portion, wherein said upper casing is superposed on said lower casing such that the engaging hook portion is resiliently fitted to the engaged hook portion, wherein a clearance in a resiliently fitting section including the engaging hook portion and the engaged hook portion is covered by the wide annular flange portion of said lower casing downward in an axial direction, wherein said sliding bearing piece includes: a thrust sliding bearing piece portion; and a radial sliding bearing piece portion, wherein said thrust sliding bearing piece portion has pluralities of inner recessed portions and outer recessed portions which are formed in at least two rows including an inner row and an outer row, wherein said inner recessed portions and said outer recessed portions are arranged with phase differences with respect to each other, wherein said radial sliding bearing piece portion has a plurality of axial grooves, and wherein each of the plurality of outer recessed portions is defined by an inner circular arc-shaped wall surface; an outer circular arc-shaped wall surface; a pair of semicircular wall surfaces; and a bottom wall surface.

18. The synthetic resin-made sliding bearing according to claim 17, wherein said upper casing is combined with said lower casing such that an inner sealing portion for performing labyrinth action is formed between an axial lower portion of the inner peripheral-side cylindrical suspended portion and an inner peripheral surface of the central cylindrical protruding portion.

19. The synthetic resin-made sliding bearing according to claim 17, wherein a plurality of through holes are formed in an outer peripheral edge side of the wide annular flange portion.

20. The synthetic resin-made sliding bearing according to claim 17, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

* * * * *